United States Patent
Nakajima et al.

(10) Patent No.: US 6,258,858 B1
(45) Date of Patent: Jul. 10, 2001

(54) CROSS-FLOW MICROCHANNEL APPARATUS AND METHOD OF PRODUCING OR SEPARATING EMULSIONS MAKING USE THEREOF

(75) Inventors: Mitsutoshi Nakajima; Yuji Kikuchi, both of Ibaraki; Takahiro Kawakatsu, Miyagi; Hideaki Komori, Tochigi; Toshikuni Yonemoto, Miyagi, all of (JP)

(73) Assignees: Japan as Represented by Director of National Food Research Institute, Ministry of Agriculture, Forestry and Fisheries, Ibaraki; Bio-Oriented Technology Research Advancement Institution, Tokyo, both of (JP)

( * ) Notice: Subject to any disclaimer, the term of this patent is extended or adjusted under 35 U.S.C. 154(b) by 0 days.

(21) Appl. No.: 09/260,416

(22) Filed: Mar. 1, 1999

(30) Foreign Application Priority Data

Jul. 2, 1998 (JP) ................................................. 10-187345

(51) Int. Cl.$^7$ .............................. B01D 17/04; B01F 3/08; B01F 5/06; C02F 1/00
(52) U.S. Cl. ................................ 516/73; 137/3; 137/896; 210/802; 366/173.1; 366/176.1; 366/176.4; 366/340; 516/197; 516/924
(58) Field of Search ............................ 516/73, 924, 197; 366/173.1, 176.1, 176.4, 340, 341; 210/800, 802; 137/7, 3, 896; 514/937, 941; 264/11

(56) References Cited

U.S. PATENT DOCUMENTS

| | | | | |
|---|---|---|---|---|
| 4,201,691 | * | 5/1980 | Asher et al. | 516/924 X |
| 4,533,254 | * | 8/1985 | Cook et al. | 366/176.1 |
| 5,247,957 | * | 9/1993 | Weisse | 137/3 |
| 5,326,484 | * | 7/1994 | Nakashima et al. | 366/340 X |
| 5,730,187 | * | 3/1998 | Howitz et al. | 137/896 X |
| 5,842,787 | * | 12/1998 | Kopf-Sill et al. | 366/340 |
| 5,904,424 | * | 5/1999 | Schwesinger et al. | 366/340 X |

FOREIGN PATENT DOCUMENTS

| | | |
|---|---|---|
| 2-95433 | 4/1990 | (JP) . |
| 9-225291 | 2/1997 | (JP) . |

OTHER PUBLICATIONS

E.S.R. Gopal, "Science of Emulsions", Asakura–shoten 1971.
F. Olson et al., "Preparation Of Liposomes Of Defined Size Distribution By Extrusion Through Polycarbonate Membranes", *Biochimica et Biophysica Acta*, 557 (1979) 9–23, Elsevier/North–Holland Biomedical Press
"Kagaku Kogaku", vol. 21, No. 4, 1957.
"Method Of Using Repeated Filtrations Through A PTFE Membrane", Proceedings of the 26th Autumn Meeting of the Society of Chemical Engineers, p. 243, 1993.

* cited by examiner

Primary Examiner—Richard D. Lovering
(74) Attorney, Agent, or Firm—Carrier, Blackman & Associates, P.C.; Joseph P. Carrier; William D. Blackman

(57) ABSTRACT

Cross-flow microchannel apparatus for producing emulsions includes a pump 9 and a pump 11 which are driven to respectively supply a continuous phase to a concave portion 4 via a supply pipe 10, a supply hole 6 and a supply port 18 and a dispersed phase to a space between the outside of a base 3 and the inside of a concave portion 2 formed in a case 1 via a supply pipe 12 and a supply hole 7. Then, by applying a predetermined pressure to the dispersed phase, the dispersed phase is formed into fine particles via a microchannels 21 and mixed with the continuous phase, thereby forming emulsions. The emulsions are withdrawn to a tank and so on via a withdrawal port 19, a withdrawal hole 8, and a withdrawal pipe 13 for emulsions. The apparatus can alternatively be used to separate an emulsion by pumping the emulsion within the concave portion 4 via pipe 10, hole 6 and port 18, such that the emulsion is separated via the microchannels 21 into a continuous phase that is withdrawn from the hole 7, and a dispersed phase that is withdrawn from the hole 8.

18 Claims, 4 Drawing Sheets

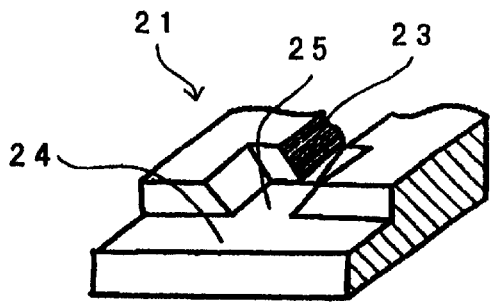 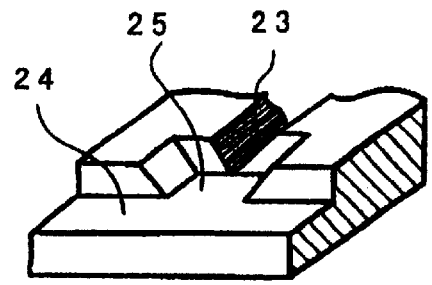
FIG. 8 ( a )  FIG. 8 ( b )
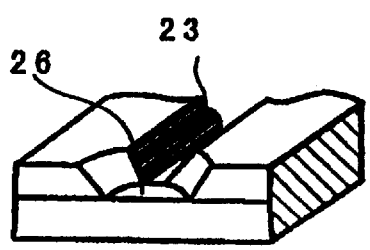 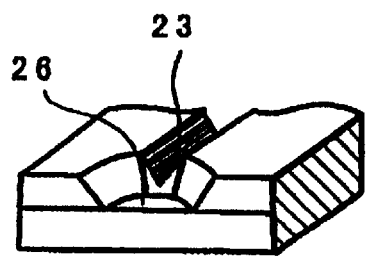
FIG. 9 ( a )  FIG. 9 ( b )
FIG. 10
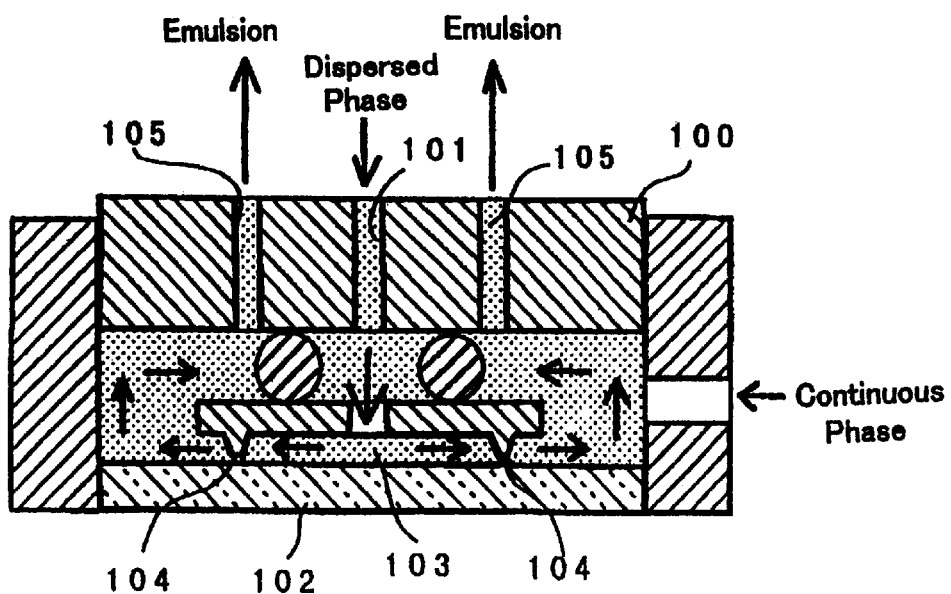

CROSS-FLOW MICROCHANNEL APPARATUS AND METHOD OF PRODUCING OR SEPARATING EMULSIONS MAKING USE THEREOF

BACKGROUND OF THE INVENTION

1. Field of the Invention

The present invention relates to a cross-flow type microchannel apparatus for producing and separating emulsions used in the food industry, manufacturing of drugs and cosmetics, etc. and to a method of producing and separating emulsions making use thereof.

2. Description of Related Art

Techniques in which a biphasic system for which a separated state is thermodynamically stable, such as that composed of a water phase and an organic phase which are emulsified to obtain a semi-stable emulsion, are conventionally known. As general emulsification methods, there have been described in "Science of Emulsions" (Asakura-shoten, 1971), the methods using a mixer, a colloid mill, a homogenizer, etc., and the method of dispersion with sound waves, which are all well-known.

The general methods mentioned above have a disadvantage in that diameters of dispersed phase particles in a continuous phase are distributed over a wide range.

Therefore, a method of using filtration through a membrane comprising polycarbonate (Biochemica et Biophysica Acta, 557 (1979), North Holland Biochemical Press); a method using repeated filtrations through a PTFE (polytetrafluoroethylene) membrane (Proceedings of the 26th Autumn Meeting of the Society of Chemical Engineers, Japan, 1993); and, a method of manufacturing homogenous emulsions by transferring a dispersed phase into a continuous phase through a porous glass membrane having uniform pores (Japanese Patent Application Laid-Open No. 2-95433), have been proposed.

As a method of producing emulsions using a nozzle or a porous plate, a laminar-flow dripping method (KAGAKU K OGAKU Vol. 21, No. 4, 1957) is also known.

The method using filtration through a membrane comprising polycarbonate and the method using repeated filtrations through a PTFE membrane theoretically cannot manufacture emulsions of particles larger than the membrane pores and cannot separate particles smaller than the membrane pores. These methods are therefore especially unsuitable for producing emulsions of large particles.

In the method using a porous glass membrane having uniform pores, when the average diameter of the membrane pores is small, particle diameters are distributed in a narrow range and thus homogenous emulsions can be obtained. When the average diameter of the membrane pores is increased, however, particle diameters become distributed over a wide range so that homogenous emulsions cannot be obtained.

In addition, in the laminar-flow dripping method, particle sizes become 1,000 $\mu$m or more and are distributed over a wide range so that homogenous emulsions cannot be obtained.

Therefore, the inventors of the present invention formerly proposed an apparatus for producing emulsions which can solve the above-mentioned problems and disadvantages of the known methods in Japanese Patent Application Laid-Open No. 9-225291.

As shown in FIG. 10, in this apparatus, a supply port 101 for a dispersed phase is formed in a center part of a base 100, a gap 103 to which the dispersed phase is supplied is formed between the base 100 and a plate 102 placed opposite the base 100, a large number of microchannels 104 having a predetermined width are formed in a boundary section between the dispersed phase and a continuous phase, the dispersed phase is brought into contact with the continuous phase via the microchannels 104, and the pressurized dispersed phase is mixed into the continuous phase as microspheres and obtained emulsions are withdrawn from a withdrawal ports 105.

In the apparatus disclosed in Japanese Patent Application Laid-Open No. 9-225291, the dispersed phase is spread from the supply port 101 formed in the center part of the base to the microchannels 104 formed to surround this supply port. Therefore, it is necessary to apply considerably high pressure to the supply port 101 in order to obtain sufficient pressure to obtain break-through at the microchannels.

In order to improve this problem, the inventors of the present invention have proposed an apparatus for withdrawing emulsions by using differences in specific gravity (differences in density) and floating emulsions. This apparatus is workable when the difference in specific gravities is sufficiently large, however, it cannot withdraw emulsions effectively when the difference in specific gravities is small.

On the other hand, in the case of separating emulsions by using the apparatus disclosed in Japanese Patent Application Laid-Open No. 9-225291, if emulsions are supplied from the supply port 101 formed in the center part of the base and the continuous phase is withdrawn via the microchannels 104, there is a block created at the inside part of the microchannels by the dispersed phase for a short time. Conversely, if emulsions are supplied to the outside region of the microchannels, a block is created at the outside part of the microchannels of the dispersed phase for a short time.

SUMMARY OF THE INVENTION

To solve the above-mentioned problems of the known, and proposed methods and apparatus, there is provided in accordance with the present invention a cross-flow microchannel apparatus for producing emulsions, comprising: a case; a base which is accommodated in the case; and, a plate which is installed on a side of the base for forming a flow path beside or at the side of the base; wherein the case has formed therein a supply hole for a continuous phase, a supply hole for a dispersed phase, and a withdrawal hole for emulsions are formed, and in the base are formed, a supply port for the continuous phase corresponding to the supply hole for the continuous phase, a withdrawal port for emulsions corresponding to the withdrawal hole for emulsions, and microchannels opening to the flow path; and furthermore, via the microchannels, a region of the dispersed phase at the outside of the base and the flow path for the continuous phase at the inside of the base are connected.

There is also provided in accordance with the present invention a cross-flow microchannel apparatus for separating emulsions, comprising: a case, a base which is accommodated in the case, and a plate which is installed on a side of the base for forming a flow path beside the base, wherein: in the case, a supply hole for emulsions, a withdrawal hole for a continuous phase, and a withdrawal hole for at least one of a dispersed phase and emulsions are formed, and in the base, a supply port for emulsions corresponding to the supply hole for emulsions, a withdrawal port for the dispersed phase or emulsions corresponding to the withdrawal hole for the dispersed phase or emulsions, and microchannels opening to the flow path are formed; and furthermore, via the microchannels, the region of continuous phase at the outside of the base and the flow path for emulsions at the inside of the base are connected.

The separation of the emulsions includes removing particles having diameters which are less than a certain value from the emulsions. Essentially, the apparatus of the invention is the same for producing emulsions from continuous and dispersed phases, and for separating emulsions into continuous and dispersed phases, although the supply and withdrawal holes/ports in the apparatus would be used in relation to different ones of the emulsions, continuous phase and dispersed phase depending on what the apparatus is used for.

In the above-mentioned apparatus, a horizontal terrace may be formed from the microchannels to a flow path at the inside of the base as a form of microchannels. It becomes clear that forming a terrace makes a dispersed phase having larger diameter components enter into a continuous phase.

It is preferable to make a part of the base a taper-like notch, so that pressure is concentrated to the microchannels, and thereby it is possible to effectively produce emulsions by using lower pressure.

It is possible to make the structure simple by making a plate which forms a flow path between the base combined with a lid body which covers a concave portion of the case which receives the base. In addition, it is possible to externally confirm the production and separation of emulsions and to vary production and separation conditions while observing the process by making the plate transparent, i.e., by employing a glass plate or on the like.

It is possible to improve the sealing characteristics of the apparatus by providing a sheet comprising silicon rubber between the inside of the case and the base. In addition, it is possible to form microchannels in any shape having a predetermined width by adopting an etching process, electron beam irradiation, or a microprocessing technique such as a CVD method or the like, which is one of the manufacturing steps used in producing semiconductor integrated circuits.

On the other hand, there is provided in accordance with the present invention a method of producing emulsions making use of the above-mentioned apparatus, comprising the steps of: supplying a continuous phase to a flow path at the inside of the base via the supply hole for the continuous phase formed in the case and the supply port for the continuous phase formed in the base; supplying pressurized dispersed phase to a region at the outside of the base via the supply hole for the dispersed phase formed in the case; and mixing the dispersed phase into the continuous phase via the microchannels.

Here, it is possible to move particles of emulsions produced in the microchannels away from the microchannels quickly by increasing the speed of the continuous phase which flows in the flow path inside of the base. In other words, it is possible to easily control the amount of emulsion to be produced by controlling the speed of flow in the continuous phase.

Therefore, it is preferable to detect the most efficient speed of the continuous phase when producing emulsions and to operate the apparatus at this speed.

There is also provided in accordance with the present invention a method of separating emulsions making use of the above-mentioned apparatus, comprising the steps of: supplying pressurized emulsions to the flow path at the inside of the base via the supply hole for emulsions formed in the case and the supply port for emulsions formed in the base, and then withdrawing the continuous phase to the outside of the flow path via the microchannels.

As mentioned above, it is also possible to easily control the amount of emulsions to be separated by controlling the speed of flow of the emulsions.

BRIEF DESCRIPTION OF THE DRAWINGS

FIG. 8 (*a*) and (*b*) are perspective views of another example of an entrance to the microchannels employed by the apparatus according to the invention;

FIG. 9 (*a*) and (*b*) are perspective views of another example of an exit from the microchannels employed by the apparatus according to the invention; and FIG. 10 is a vertical section of the conventional microchannel apparatus previously proposed by the inventors.

DETAILED DESCRIPTION OF THE PREFERRED EMBODIMENTS

Figure 1:
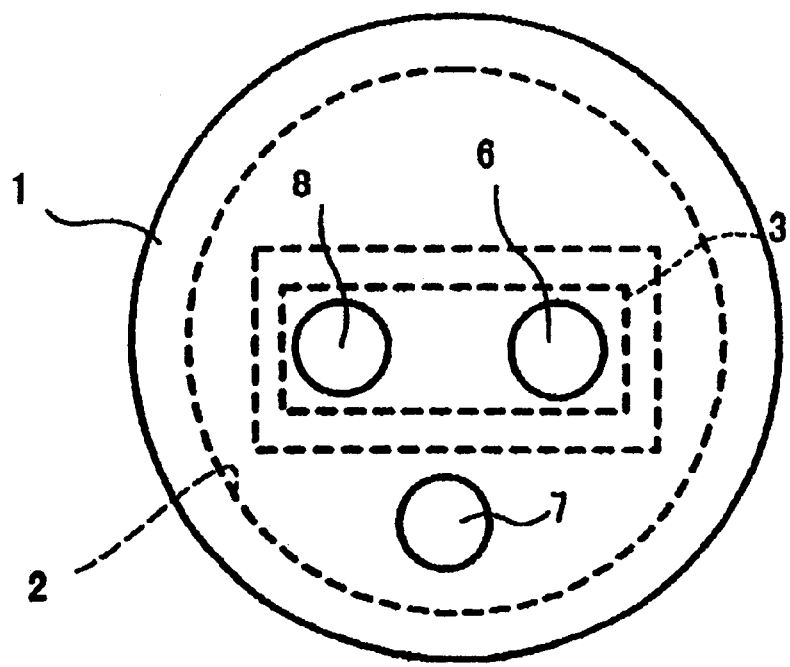
FIG. 1 is a plan view of a cross-flow type microchannel apparatus according to a preferred embodiment of the present invention.
Figure 2:
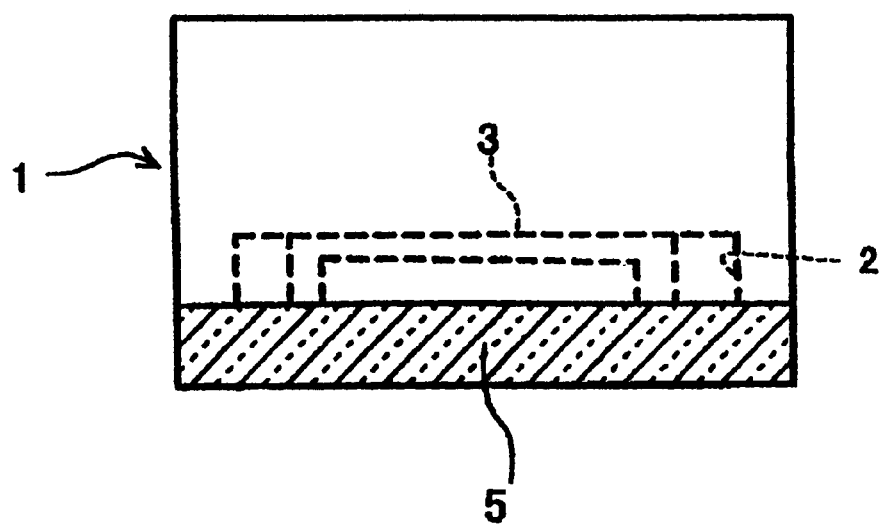
FIG. 2 is a side view of the cross-flow type microchannel apparatus of FIG. 1.
Figure 3:
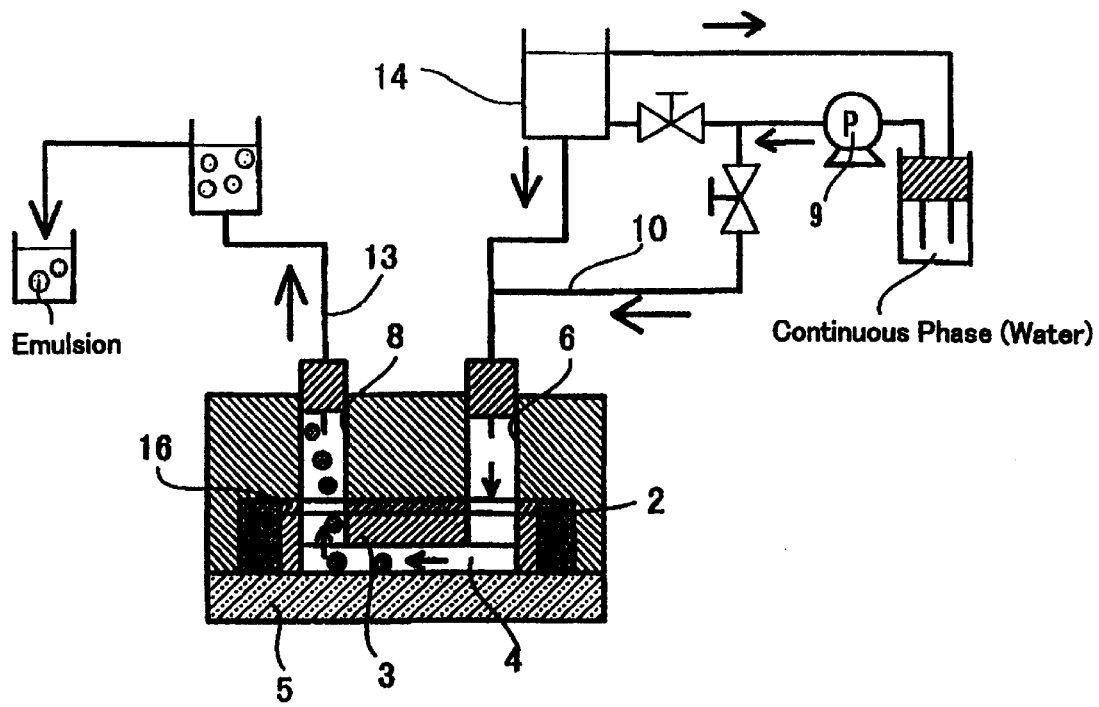
FIG. 3 is an overall view of a process for producing emulsions employing the cross-flow microchannel apparatus according to the invention, showing the apparatus in cross-section.
Figure 4:
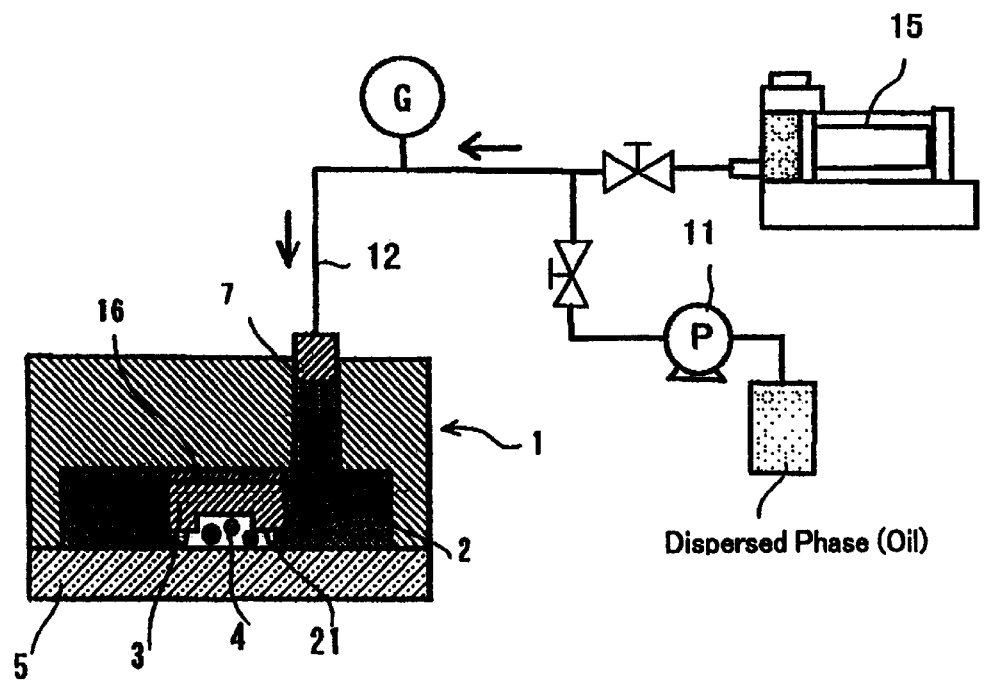
FIG. 4 is an overall view of a process for producing emulsions employing the cross-flow microchannel apparatus according to the invention, showing the apparatus in another cross-section.

A preferred embodiment of the present invention will now be described referring to FIGS. 1–4, in which:

FIG. 1 is a plan view of a cross-flow microchannel apparatus;

FIG. 2 is a side view of the cross-flow microchannel apparatus;

FIG. 3 is an overall view of a process for producing emulsions employing the cross-flow microchannel apparatus according to the invention, showing the apparatus in cross-section; and FIG. 4 is an overall view of a process for producing emulsions employing the cross-flow microchannel apparatus according to the invention, showing the apparatus in another cross-section.

In the cross-flow microchannel apparatus according to the present invention, a concave portion 2 is formed in a side of a case 1, a base 3 is placed in the concave portion 2, and the side of the base to which another concave portion 4 opens is covered with a plate 5, such as a glass plate or the like, in order that liquid cannot escape. The concave portion 4 is formed in the concave portion 2 and the base 3.

A supply hole 6 for a continuous phase, a supply hole 7 for a dispersed phase, and a withdrawal hole 8 for emulsions are formed in the top side of the case 1. A supply pipe 10 for the continuous phase (water) equipped with a pump 9 is connected to the supply hole 6, a supply pipe 12 for the dispersed phase (oil) equipped with a pump 11 is connected to the supply hole 7, and a withdrawal pipe 13 for emulsions is connected to the withdrawal hole 8. Indicated at 21 are microchannels formed in the base 3, as discussed further below.

A reservoir 14 is provided in the supply pipe for the continuous phase, so as to supply the continuous phase at a predetermined pressure. A microfeeder 15 is provided in conjunction with the dispersed phase supply pipe, so as to adjust the amount of supply of the dispersed phase.

The base 3 is placed so that the concave portion 4 opposes the plate 5. The base 3 is flexibly pushed onto the side of the plate via a sheet 16, comprising silicon rubber, which stands between the base 3 and the inside of the case 1 in order to block the concave portion 4 with the plate 5, so as to prevent liquid from escaping.

Figure 5:
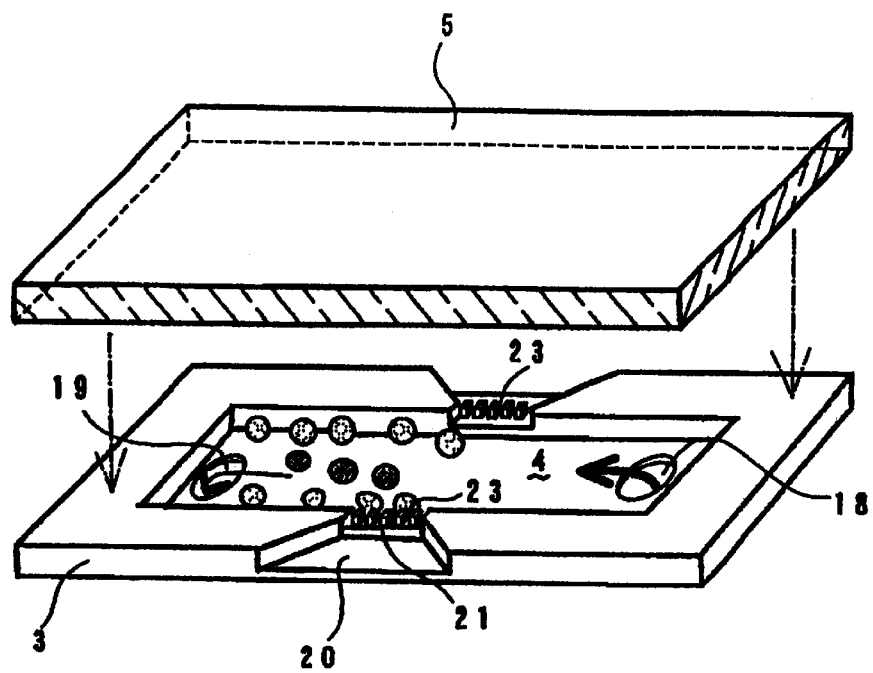
FIG. 5 is a perspective view of a base and a plate employed by the apparatus.

As shown in FIG. 5, a supply port 18 for the continuous phase corresponding to the supply hole 6 extends into an end of the concave portion 4 and is formed in the base 3, and a withdrawal port 19 for emulsions corresponding to the withdrawal hole 8 is formed in the base 3 so as to extend into the other end of the concave portion 4. The supply port 18 is connected to the supply hole 6 via an opening formed in the sheet 16, and the withdrawal port 19 is connected to the withdrawal hole 8 via another opening formed in the sheet 16.

Therefore, the concave portion 4 in the base 3 serves as a flow path or conduit for the continuous phase and the dispersed phase is pumped from the outside of the base 3 to the inside of the concave portion 2 in the case.

In addition, a taper-like notch 20 is formed in a side of the base 3, wherein the notch 20 gradually becomes narrow toward the inside of the base 3. Microchannels 21 are formed in the narrowest part of the notch 20.

Figure 6:
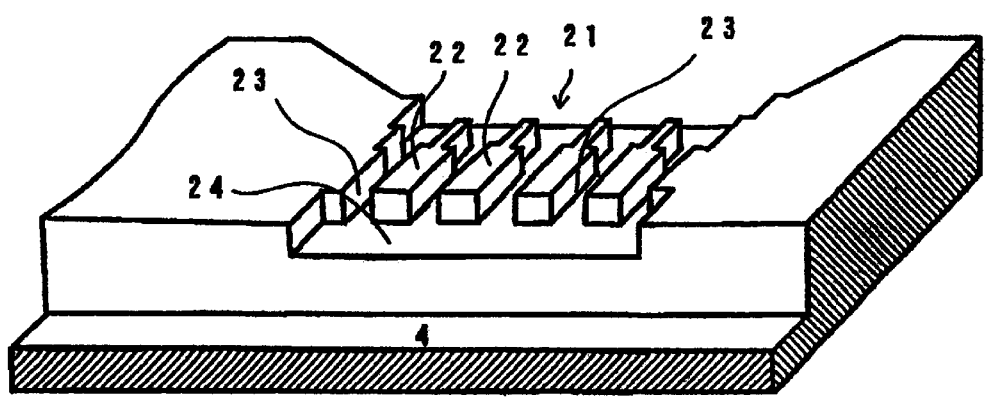
FIG. 6 is an enlarged perspective view of microchannels employed by the apparatus according to the invention.

As shown in FIG. 6, microchannels 21 have fine gaps (a plurality of microchannels) 23 between a large number (plurality) of convex portions 22 formed by applying a manufacturing technique used in semiconductor integrated circuit manufacturing. To put it concretely with regard to the size, the width of the fine gaps 23 is about 2–15 $\mu$m and the height thereof is about 4–12 $\mu$m. The dispersed phase passes through the fine gaps 23 and its particle sizes become small by applying pressure to the dispersed phase, so that the dispersed phase is dispersed (mixed) into the continuous phase and emulsions are formed.

As also shown in FIG. 6, microchannels 21 have a terrace 24 at the concave portion 4. By forming the terrace 24, dispersed phase particles are promoted so as to grow and the diameters thereof become larger.

Figure 7:
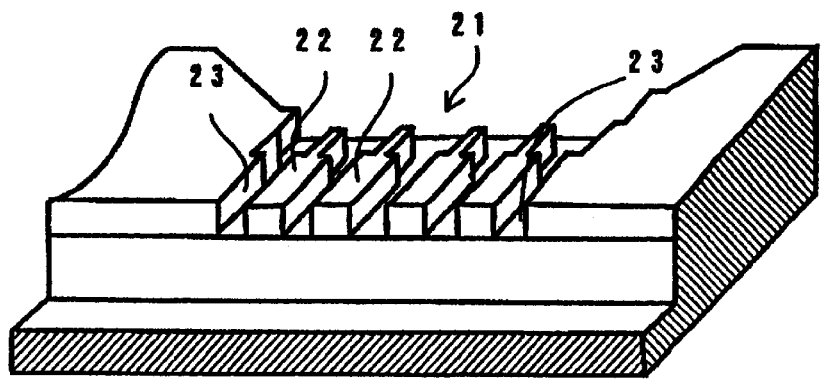
FIG. 7 is an enlarged perspective view of another example of the microchannels employed by the apparatus according to the invention.

On the other hand, as shown in FIG. 7, the microchannels 21 may be provided without the terrace.

FIG. 8 (a) and (b) are perspective views of another example of entrances to microchannels. FIG. 9 (a) and (b) are perspective views of another example of exits from microchannels. As shown in FIG. 8 (a), an entrance may comprise a wide part 25 which forms a reverse trapezoid, wherein one edge of the microchannel 21, of which one section forms a reverse trapezoid, opens to the wide part 25. Or, as shown in FIG. 8 (b), one edge of the microchannel 21, of which section forms a triangle, may open to the wide part 25. On the other hand, as shown in FIG. 9 (a) and (b), an exit may form one edge of the microchannel 21, of which one section forms a reverse trapezoid or a triangle, opening to a reverse taper part 26.

According to the present invention, there is provided a method of producing emulsions making use of the above-mentioned apparatus, comprising the steps of driving the pump 9 and the pump 11, supplying the continuous phase to the concave portion 4 via supply pipe 10, the supply hole 6 and the supply port 18, and supplying the dispersed phase to the space between the outside of the base 3 and the inside of the concave portion 2 formed in the case via the supply pipe 12 and the supply hole 7.

Here, the dispersed phase grows to comprise fine particles when it passes through the microchannels 21 by applying a certain pressure to the dispersed phase, and the fine particles are mixed with the continuous phase, so as to form emulsions. These emulsions are withdrawn to a tank and so on via the withdrawal port 19, the withdrawal hole 8 and the withdrawal pipe 13.

On the other hand, there is provided a method of separating emulsions making use of the above-mentioned apparatus, comprising the steps of connecting the supply pipe for emulsions to the supply hole 6 for the continuous phase, connecting the withdrawal pipe for the continuous phase to the supply hole 7 for the dispersed phase, connecting the withdrawal pipe for the dispersed phase or emulsions to the withdrawal hole 8 and pumping and mixing the pressurized emulsions via a pump into the flow path defined by the concave portion 4 formed in the base 3. Here, only the continuous phase is withdrawn through the microchannels 21 and the hole 7, or only the dispersed phase particles whose diameter is smaller than the width of the microchannels 21 and the continuous phase are made to penetrate through the microchannels 21 and are then withdrawn. The dispersed phase whose particle diameter is large or emulsions which contain the dispersed phase are then withdrawn from the withdrawal pipe 13 for dispersed phases or emulsions.

In the above-mentioned separation of emulsions, the direction to which emulsions flow and the direction from which emulsions are separated cross perpendicularly as understood from FIGS. 1, 3 and 4, and therefore, any dispersed phase particles which cannot penetrate the microchannel are scratched out and moved to the hole 8 through the flow of emulsions, so that there is no fear of blockages.

As described above, according to the cross-flow microchannel apparatus of the present invention, since the base is provided in the case, the flow path for the continuous phase is formed between the base and the plate, and a microchannel is formed in this base, which opens in the direction where the microchannel and the flow path cross, and thereby emulsions can be efficiently produced by dispersing a dispersed phase into a continuous phase.

According to another method of use of the cross-flow microchannel apparatus of the present invention, the base is provided in the case, the flow path for emulsions is formed between the base and the plate, and microchannels are formed in the base. The microchannels open in the direction where the microchannels and this flow path cross, and by forcing the emulsions under pressure along the flow path and through the microchannels a continuous phase and a dispersed phase can be efficiently separated from the emulsions.

Furthermore, it is possible to easily control the amount of emulsions to be produced or separated using the apparatus by controlling the speed of flow in the continuous phase or of emulsions which flow in the path formed between the base and the plate. The present invention obtains superior operation compared to the prior art. Although there have been described what are at present considered to be the preferred embodiments of the invention, it will be understood by those in the art that variations and modifications may be made thereto without departing from the gist or essence of the invention. The scope of the Invention is indicated by the appended claims, rather than by the foregoing description.

What is claimed is:

1. A cross-flow microchannel apparatus, comprising:
    a case;
    a base which is accommodated in said case; and
    a plate which is installed facing a side of said base for forming a flow path in said base; wherein
    supply and withdrawal holes are formed in said case for supplying at least one of a continuous phase, a dispersed phase and an emulsion within the case and for withdrawing at least one of the continuous phase, the dispersed phase and the emulsion from said case;
    a supply port corresponding to one said supply hole, a withdrawal port corresponding to one said withdrawal hole and microchannels opening to the flow path are formed in said base; and furthermore, via the microchannels, a region within said case at the outside of said base and the flow path at the inside of said base are connected.

2. A cross-flow microchannel apparatus defined in claim 1, wherein a horizontal terrace is formed from said microchannels to the flow path at the inside of the base.

3. A cross-flow microchannel apparatus defined in claim 1, wherein a tapered notch leading to the microchannels is formed in said base.

4. A cross-flow microchannel apparatus defined in claim 1, wherein said plate comprises a lid body which covers a concave portion of the case which accommodates the base therein.

5. A cross-flow microchannel apparatus defined in claim 1, wherein said plate is a transparent plate.

6. A cross-flow microchannel apparatus defined in claim 1, wherein a sheet, comprising silicon rubber, is provided between the inside of said case and said base.

7. A cross-flow microchannel apparatus defined in claim 1, wherein a supply hole for the continuous phase, a supply hole for the dispersed phase and a withdrawal hole for said emulsion are formed in said case; and
    the supply port corresponds to the supply hole for the continuous phase, the withdrawal port corresponds to the withdrawal hole for said emulsion, said region within said case is for the dispersed phase and said flow path is for the continuous phase.

8. A method of producing emulsions making use of the cross-flow microchannel apparatus defined in claim 7, comprising steps of:
    supplying a continuous phase to said flow path at the inside of the base via the supply hole for the continuous phase formed in the case and the supply port for the continuous phase formed in the base;
    supplying pressurized dispersed phase to the region of dispersed phase at the outside of the base via the supply hole for the dispersed phase formed in the case; and
    mixing the dispersed phase into the continuous phase via the microchannels.

9. A method of producing emulsions making use of the cross-flow microchannel apparatus defined in claim 8, wherein an amount of emulsions to be produced per unit time is controlled by controlling the speed of flow of the continuous phase in the flow path at the inside of said base.

10. A method of producing emulsions as defined in claim 8, wherein said base has a concave portion defined in the side thereof facing said plate, said flow path including said concave portion.

11. A method of producing emulsions as defined in claim 10, wherein said microchannels are formed in said base at a boundary of said concave portion.

12. A cross-flow microchannel apparatus defined in claim 1, wherein a supply hole for said emulsion, a withdrawal hole for said continuous phase, and a withdrawal hole for at least one of the dispersed phase and emulsions are formed in said case; said supply port corresponding to said supply hole for emulsions, said withdrawal port corresponding to said withdrawal hole for at least one of the dispersed phase and emulsions, the region at the outside of said base is for the continuous phase and the flow path at the inside of said base is for said supplied emulsion.

13. A method of separating emulsions making use of the cross-flow microchannel apparatus defined in claim 12, comprising steps of:
    supplying a pressurized emulsion to the flow path at the inside of the base via said supply hole for emulsions formed in the case and a supply port for emulsions formed in the base; and
    withdrawing the continuous phase to the outside of the flow path via the microchannels.

14. A method of separating emulsions making use of the cross-flow microchannel apparatus defined in claim 13, wherein an amount of the continuous phase to be withdrawn per unit time is controlled by controlling the speed of flow of the emulsions in the flow path at the inside of said base.

15. A method of separating emulsions as defined in claim 13, wherein said base has a concave portion defined in the side thereof facing said plate, said flow path including said concave portion.

16. A method of separating emulsions as defined in claim 15, wherein said microchannels are formed in said base at a boundary of said concave portion.

17. A cross-flow microchannel apparatus comprising:
    a case;
    a base which is accommodated in said case; and
    a plate which is installed facing a side of said base for forming a flow path in said base; wherein
    supply and withdrawal holes are formed in said case for supplying at least one of a continuous phase, a dispersed phase and an emulsion within the case and for withdrawing at least one of the continuous phase, the dispersed phase and the emulsion from said case;
    a supply port corresponding to one said supply hole, a withdrawal port corresponding to one said withdrawal hole and microchannels opening to the flow path are formed in said base; and furthermore, via the microchannels, a region within said case at the outside of said base and the flow path at the inside of said base are connected; and
    said base has a concave portion defined in the side thereof facing said plate, said flow path including said concave portion.

18. A cross-flow microchannel apparatus defined in claim 17, wherein said microchannels are formed in said base at a boundary of said concave portion.

* * * * *

UNITED STATES PATENT AND TRADEMARK OFFICE
CERTIFICATE OF CORRECTION

PATENT NO. : 6,258,858 B1
DATED : July 10, 2001
INVENTOR(S) : Nakajima et al.

It is certified that error appears in the above-identified patent and that said Letters Patent is hereby corrected as shown below:

Column 2,
Line 9, after "from" delete "a";
Line 44, change "the side" to -- the inside --
Line 47, change "emulsions are formed" to -- emulsions --.

Column 6,
Line 65, begin a new paragraph with "Although".

Column 7,
Line 3, change "Invention" to -- invention --.

Signed and Sealed this

Twenty-sixth Day of March, 2002

JAMES E. ROGAN
*Director of the United States Patent and Trademark Office*

*Attest:*

*Attesting Officer*